United States Patent
Ammar et al.

(10) Patent No.: US 12,294,297 B2
(45) Date of Patent: May 6, 2025

(54) CHARGE-PUMP BASED AC-DC POWER CONVERTER WITH POWER FACTOR CORRECTION AND OPTIMIZED CURRENT PATHS

(71) Applicant: DANMARKS TEKNISKE UNIVERSITET, Kongens Lyngby (DK)

(72) Inventors: Ahmed Morsi Ammar, Kongens Lyngby (DK); Yasser A. A. Nour, Kongens Lyngby (DK); Arnold Knott, Kongens Lyngby (DK); Frederik Monrad Spliid, Kongens Lyngby (DK)

(73) Assignee: DANMARKS TEKNISKE UNIVERSITET, Kongens Lyngby (DK)

( * ) Notice: Subject to any disclaimer, the term of this patent is extended or adjusted under 35 U.S.C. 154(b) by 236 days.

(21) Appl. No.: 18/008,599

(22) PCT Filed: Jun. 4, 2021

(86) PCT No.: PCT/EP2021/065028
§ 371 (c)(1),
(2) Date: Dec. 6, 2022

(87) PCT Pub. No.: WO2021/249888
PCT Pub. Date: Dec. 16, 2021

(65) Prior Publication Data
US 2023/0253876 A1    Aug. 10, 2023

(30) Foreign Application Priority Data
Jun. 11, 2020   (EP) .................................. 20179423

(51) Int. Cl.
H02M 1/42 (2007.01)
H02M 3/07 (2006.01)
H02M 3/335 (2006.01)

(52) U.S. Cl.
CPC .......... *H02M 1/4241* (2013.01); *H02M 3/07* (2013.01); *H02M 3/33571* (2021.05)

(58) Field of Classification Search
CPC ... H02M 1/4241; H02M 3/07; H02M 3/33571
See application file for complete search history.

(56) References Cited

U.S. PATENT DOCUMENTS 6,034,489 A    3/2000  Weng
9,013,111 B2   4/2015  Lin et al.
(Continued)

FOREIGN PATENT DOCUMENTS

CN    207868995 U    9/2018
TW    201210182 A1   3/2012

OTHER PUBLICATIONS

Ammar et al: "Analysis and Design of a Charge-Pump-Based Resonant AC-DC Converter with Inherent PFC Capability", DOI 10.1109/JESTPE.2020.2966143, IEEE Journal of Emerging and Selected Topics in Power Electronics, Jan. 13, 2020.

*Primary Examiner* — Jue Zhang
*Assistant Examiner* — Lakaisha Jackson
(74) *Attorney, Agent, or Firm* — DINSMORE & SHOHL LLP (57) ABSTRACT

An AC-DC power converter includes: an AC rectification circuit configured to convert an AC line voltage into a rectified line voltage; a charge-pump-based power factor correction sub-converter configured to provide a DC-bus supply voltage; a resonant sub-converter configured to convert the DC-bus supply voltage to a DC output voltage or DC output current, the resonant sub-converter including: a resonant tank configured to convert the DC-bus supply (Continued)

voltage to a resonant voltage or current; and an output rectification circuit configured to generate the DC output voltage or DC output current from the resonant voltage or current to supply a converter load, and a controllable switch network shared by the charge-pump-based power factor correction sub-converter and the resonant sub-converter.

15 Claims, 10 Drawing Sheets

(56) References Cited

U.S. PATENT DOCUMENTS

| | | | |
|---|---|---|---|
| 10,707,763 B1* | 7/2020 | Xiong | H05B 45/50 |
| 2019/0326812 A1* | 10/2019 | Li | H02M 3/01 |
| 2019/0386573 A1* | 12/2019 | Jacques | H05B 45/382 |
| 2019/0393770 A1* | 12/2019 | Deng | H02M 1/088 |

* cited by examiner

CHARGE-PUMP BASED AC-DC POWER CONVERTER WITH POWER FACTOR CORRECTION AND OPTIMIZED CURRENT PATHS

CROSS-REFERENCE TO RELATED APPLICATIONS

This application is the U.S. National Stage of PCT/EP2021/065028 filed on Jun. 4, 2021, which claims priority to European Patent Application 20179423.7 filed on Jun. 11, 2020, the entire content of both are incorporated herein by reference in their entirety.

FIELD OF THE INVENTION

The present disclosure relates to an AC-DC converter for converting an AC line voltage to a DC output voltage or DC output current, the AC-DC converter comprising a charge-pump-based power factor correction sub-converter and a resonant sub-converter. The present disclosure further relates to a method for operating the AC-DC power converter.

BACKGROUND OF THE INVENTION

The majority of current light systems use high-brightness light-emitting diodes (LEDs) as the light source, for many reasons that include their longer lifetime, higher energy savings, smaller form factors, as well as higher quality and durability compared to other technologies. The complete system comprises the electrical part (light engine), the mechanical part (luminaire), and the optical part (reflector and lens). The bottleneck for the size, weight, and cost reduction, as well as higher reliability and efficiency, is the light engine, which consists of an LED module (the LED array and the substrate material it is mounted on) and a driver (electrical engine). While the LED module is responsible for the limit in energy efficacy (lm/W), the driver is the limiting factor for size, weight, cost and reliability.

An LED driver comprises an AC-DC converter. A high power factor is, generally, required, or at least highly desirable, in the AC-DC converter to reduce power losses and distortion introduced to the AC grid by input current harmonics. In case the power system is loaded by a nonlinear load, e.g. switching converter, current drawn by the load is interrupted by the switching activity and therefore contains numerous higher frequency components that are multiples of the power system frequency. Such harmonic distortion reduces the average power transferred to the load of the AC-DC power converter in addition to contaminating the AC grid. Power factor correction brings the power factor of a power circuit closer to 1 by making the load appear more resistive to the AC grid. The power factor correction, thus, preferably, achieves a close-to-sinusoidal line current that is substantially proportional to, and substantially in-phase with, the AC grid-voltage.

The conventional solution for LED drivers is a two-stage converter, where the first stage is an AC-DC rectifier with power factor correction (PFC) followed by an energy-storage capacitor, and where the second stage is a DC-DC converter providing the voltage and current levels that apply to the LED load electrical characteristics. This conversion has to comply with a number of regulations dictating the shape of the input current to limit the mains voltage distortion.

Pulse-width-modulated (PWM) converters have been the primary candidate for both driver stages. They can provide high power factor and efficiency, and are easy to control. However, in addition to the high conducted electromagnetic interference (EMI) from the rectangular waveforms, their operation is based on hard switching. Accordingly, they typically operate at low frequencies in order to limit the switching losses. This, in turn, results in larger sizes for the passive components needed to store and process the power transferred to the load every switching cycle. Consequently, there is an increasing demand for smaller and highly efficient LED drivers.

On the other hand, resonant inverters and converters typically have substantially lower switching losses than their PWM counterparts. The resonant inverters of AC-DC power converters in accordance with the present invention may therefore be configured to provide zero-voltage-switching (ZVS) and/or zero-current-switching (ZCS) to provide high power conversion efficiencies at high switching frequencies.

SUMMARY OF THE INVENTION

The present disclosure relates to an improved AC-DC power converter. The AC-DC power converter can be used in a LED driver, but, as will be appreciated by a person skilled in the art, may be utilized in a wide range of applications and product categories, including chargers and power supplies for industrial and consumer electronics.

The presently disclosed AC-DC converter, comprises, according to a first embodiment:
an AC rectification circuit configured to convert an AC line voltage into a rectified line voltage;
a charge-pump-based power factor correction sub-converter configured to provide a DC-bus supply voltage;
a resonant sub-converter configured to convert the DC-bus supply voltage to a DC output voltage or DC output current, the resonant sub-converter comprising:
a. a resonant tank configured to convert the DC-bus supply voltage to a resonant voltage or current;
b. an output rectification circuit configured to generate the DC output voltage or DC output current from the resonant voltage or current to supply a converter load,
a controllable switch network shared by the charge-pump-based power factor correction sub-converter and the resonant sub-converter.

Preferably, the charge-pump-based power factor correction sub-converter and the resonant sub-converter have separate current paths from the switch network. More specifically, the current path for the charge-pump-based power factor correction sub-converter may be separate from the current path for an output load gained through the resonant tank. This also means that the resonant tank and the charge-pump-based power factor correction sub-converter may have independent and separated power flow. In one embodiment, the charge-pump-based power factor correction sub-converter is therefore configured to provide power factor correction and charges an energy-storage capacitor arranged in parallel with the controllable switch network. In one embodiment, the resonant tank together with the controllable switch network is configured to convert the DC-bus supply voltage to a DC output voltage or DC output current.

Resonant converters allow the utilization of soft-switching techniques through the intrinsic behavior of the currents and voltages in the switches, resulting in substantially lower switching losses. The present AC-DC converter can be seen as a 1.5-stage AC-DC converter solution since a limited part (the controllable switch network) is shared by the charge-pump-based power factor correction sub-converter and the resonant sub-converter, wherein the resonant sub-converter is nevertheless functionally decoupled from the PFC operation. More precisely, using the presently disclosed AC-DC converter, an operation of the resonant tank may be independent of a power factor correction operation of the charge-pump-based power factor correction sub-converter from a power-flow perspective. Consequently, the system may be configured to perform independent operation of: 1) charge-pump-based power factor correction, and 2) DC-DC conversion of the DC-bus supply voltage to a DC output voltage or DC output current. 2) may be performed by soft-switching operation of the resonant tank. This also means that the resonant tank and the charge-pump-based power factor correction sub-converter may have independent and separated power flow.

The charge-pump-based power factor correction sub-converter may regulate the input current inherently, whereas the resonant sub-converter configured to convert the DC-bus supply voltage to a DC output voltage or DC output current may provide voltage/current regulation with respect to the output load. The two sub-converters share the switch network, resulting in lower components count, while the current paths for the charge-pump-based power factor correction sub-converter and the resonant sub-converter are separate. More specifically, the charge-pump-based power factor correction sub-converter may have a current path as illustrated in FIG. 5, i.e. one current path involving the controllable switch network, an energy-storage capacitor arranged in parallel with the controllable switch network, a charge pump capacitor ($C_P$) and a charge pump inductor ($L_P$) serially connected between the rectified line voltage and the controllable switch network, and one current path (load current path) involving the resonant tank, illustrated by an equivalent $R_{DC}$ in FIG. 5. The resonant tank may be decoupled from the charge-pump-based power factor correction sub-converter.

The presently disclosed AC-DC power converter may thereby provide a solution that has few components, relatively simple design of the magnetic aspects of the circuit, high efficiency and yet high flexibility.

Figure 1:
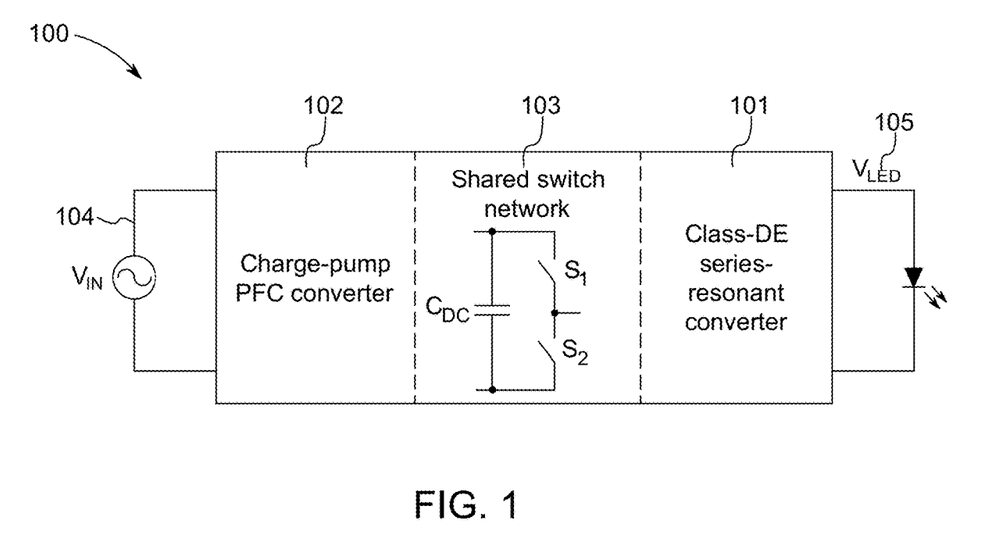
FIG. 1 shows a block diagram of the presently disclosed AC-DC converter.

A block diagram of the presently disclosed AC-DC converter is shown in FIG. 1. A detailed exemplary embodiment is shown in FIG. 2.

Figure 2:
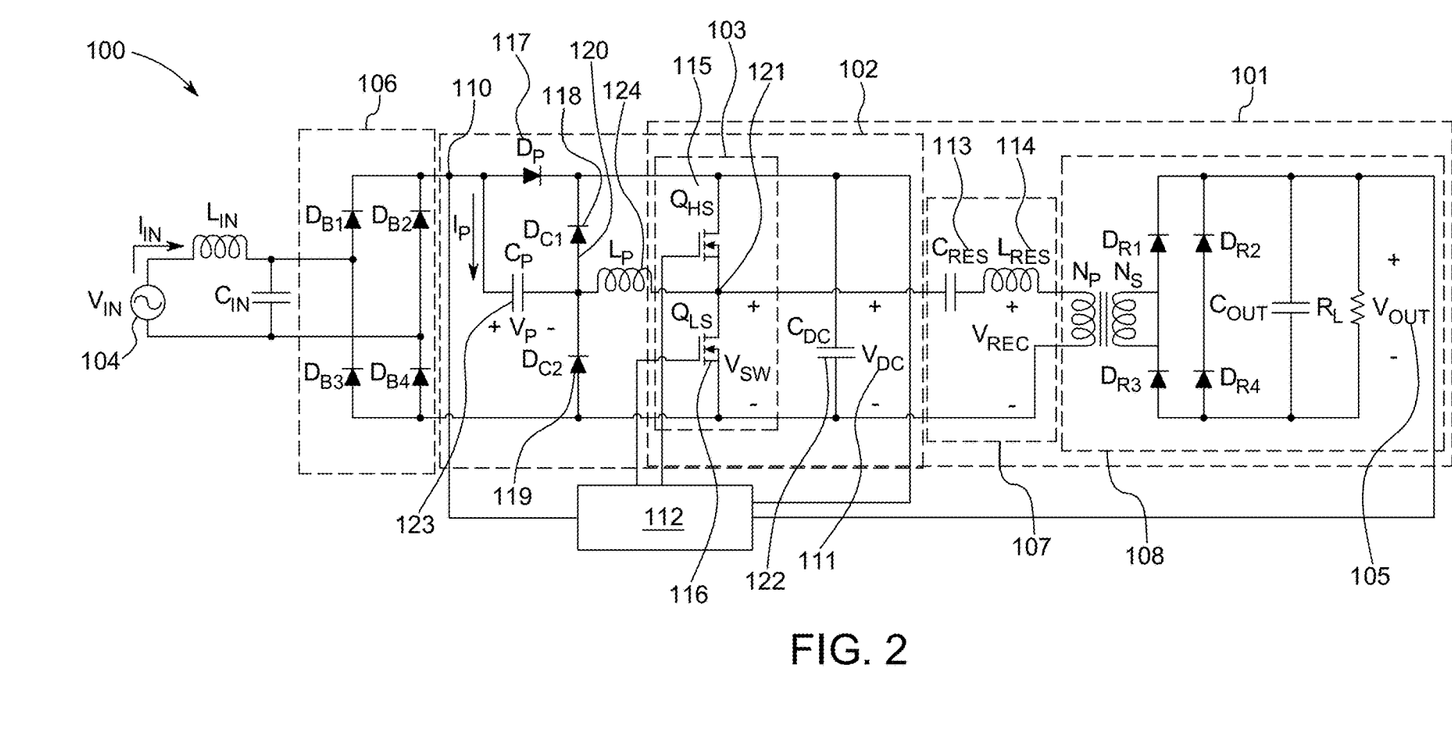
FIG. 2 shows a detailed exemplary embodiment of the presently disclosed AC-DC converter.

More specifically, it can be seen in FIG. 2 that the resonant sub-converter resonant tank may be a series-resonant tank comprising a resonant capacitor ($C_{RES}$) and a resonant inductor ($L_{RES}$) serially connected. The controllable switch network may comprise a high-side switch ($Q_{HS}$) and a low-side switch ($Q_{LS}$) in a half-bridge bridge configuration. On the charge-pump-based power factor correction sub-converter side, there may be a charge pump capacitor ($C_P$) and a charge pump inductor ($L_P$) serially connected between the rectified line voltage and the controllable switch network. Since this configuration may have the effect that the voltage change across the capacitor is no longer equal to the input voltage with the voltage drop across the inductor, two clamping diodes $D_{C1}$ and $D_{C2}$ may be added to clamp $V_C$ (voltage over $D_{c2}$) to a maximum voltage of $V_{DC}$ and minimum voltage of zero. The operation of these components and the AC-DC converter generally are described in further detail below. By sharing the switch network and nevertheless having separate current paths for the charge-pump-based power factor correction sub-converter and the resonant sub-converter, both low components count and reduced stress on the passive components can be achieved.

The present disclosure further relates to a method of converting an AC line voltage to a DC output voltage or DC output current, the method comprising the steps of:
  providing an AC-DC power converter as disclosed herein;
  operating the AC-DC power converter by:
  a. adjusting the DC output voltage or DC output current by adjusting the switching frequency of the controllable switch network, and/or
  b. adjusting the DC output voltage or DC output current by adjusting on/off duty cycle modulation of the controllable switch network.

A person skilled in the art will recognize that the presently disclosed method of converting an AC line voltage to a DC output voltage or DC output current may be performed using any embodiment of the presently disclosed AC-DC power converter.

BRIEF DESCRIPTION OF THE DRAWINGS

The drawings are exemplary and are intended to illustrate some of the features of the presently disclosed AC-DC converter, and are not to be construed as limiting to the presently disclosed invention.

DETAILED DESCRIPTION OF THE INVENTION

The present disclosure relates to an AC-DC power converter comprising: an AC rectification circuit configured to convert an AC line voltage into a rectified line voltage; a charge-pump-based power factor correction sub-converter configured to provide a DC-bus supply voltage; and a resonant sub-converter configured to convert the DC-bus supply voltage to a DC output voltage or DC output current. The resonant sub-converter preferably comprises a resonant tank configured to convert the DC-bus supply voltage to a resonant voltage or current; and an output rectification circuit configured to generate the DC output voltage or DC output current from the resonant voltage or current to supply a converter load. The AC-DC power converter may further comprise a controllable switch network shared by the charge-pump-based power factor correction sub-converter and the resonant sub-converter. Preferably, the charge-pump-based power factor correction sub-converter and the resonant sub-converter have separate current paths from the switch network.

The resonant sub-converter may be a class DE resonant converter. However, the skilled person will understand that the resonant sub-converter may have any of numerous well-known topologies, such as a class E, class F, class DE, class EF etc.

The AC-DC power converter may comprise a controller configured to regulate the DC-bus supply voltage and/or the DC output voltage or DC output current based on the AC line voltage, the DC-bus supply voltage and/or the DC output voltage or DC output current. The controller may, alternatively, or in combination, be configured to adjust the DC output voltage or DC output current in accordance with a DC reference voltage. The adjustment may be achieved by adjusting the switching frequency of the controllable switch network, and/or by adjusting on/off duty cycle modulation of the controllable switch network. Moreover, the controller is configured to apply burst-mode, which may also be referred to as pulse skipping mode, which may be particularly beneficial for light loads.

The AC-DC power converter is, preferably, based on soft-switching, and can thus achieve high efficiency at high and very high frequencies, where all of power stage components scale with frequency, except the energy storage capacitor. This can substantially reduce the size and weight of the converter. In one embodiment the AC-DC power converter is configured to operate at a switching frequency of at least 500 kHz, preferably at least 800 kHz, more preferably at least 1 MHz, even more preferably at least 10 MHz, most preferably at least 30 MHz. Preferably, the AC-DC power converter is configured for zero voltage switching of the switch network.

FIG. 1 shows a block diagram of the presently disclosed AC-DC converter (100) for converting an AC line voltage (104) to a DC output voltage (105). The AC-DC converter (100) comprises a resonant sub-converter (101), a charge-pump-based power factor correction sub-converter (102). A controllable switch network (103) is shared by the charge-pump-based power factor correction sub-converter (102) and the resonant sub-converter (101). In the load is an LED diode load. As would be understood by a person skilled in the art, the load may be any output load that would benefit from the presently disclosed AC-DC converter (100).

FIG. 2 shows a detailed exemplary embodiment of the presently disclosed AC-DC converter (100). The AC-DC converter (100) comprises an AC rectification circuit (106) configured to convert an AC line voltage (104) into a rectified line voltage (110). The AC-DC converter (100) further comprises a charge-pump-based power factor correction sub-converter (102) configured to provide a DC-bus supply voltage (111). The AC-DC converter (100) further comprises a resonant sub-converter (101) configured to convert the DC-bus supply voltage (111) to a DC output voltage or DC output current (105). The resonant sub-converter (101) comprises a resonant tank (107) configured to convert the DC-bus supply voltage (111) to a resonant voltage or current; and an output rectification circuit (108) configured to generate the DC output voltage or DC output current (105) from the resonant voltage or current to supply a converter load. A controllable switch network (103) is shared by the charge-pump-based power factor correction sub-converter (102) and the resonant sub-converter (101). The resonant tank (107) is a series-resonant tank comprising a resonant capacitor (113, $C_{RES}$) and a resonant inductor (114, $L_{RES}$) serially connected. The controllable switch network (103) comprises a high-side switch (115, $Q_{HS}$) and a low-side switch (116, $Q_{LS}$) in a half-bridge bridge configuration. The charge-pump-based power factor correction sub-converter (102) comprises a charge pump capacitor (123, $C_P$) and a charge pump inductor (124, $L_P$) serially connected between the rectified line voltage (110) and a switch network node (121) defined by a connection between the high-side switch (115, $Q_{HS}$) and the low-side switch (116, $Q_{LS}$). The charge-pump-based power factor correction sub-converter (102) further comprises a charge pump rectifying element (117, $D_P$) connected between the rectified line voltage (110) and the high-side switch (115, $Q_{HS}$). The charge-pump-based power factor correction sub-converter (102) further comprises two clamping diodes (118, $D_{C1}$, 119, $D_{C2}$) connected to a charge pump node (120) defined by a connection between the charge pump capacitor (123, $C_P$) and the charge pump inductor (124, $L_P$). More specifically, in this embodiment the first clamping diode (118, $D_{C1}$) is connected between the charge pump node (120) and a cathode of the charge pump rectifying element (117, $D_P$), and the second clamping diode (119, $D_{C2}$) is connected between the charge pump node (120) and a negative terminal of the rectified line voltage (110). The AC-DC power converter (100) further comprises an energy-storage capacitor (122, $C_{DC}$) arranged in parallel with the controllable switch network (103). A controller (112) may be configured to adjust the switching frequency and/or on/off duty cycle of the controllable switch network (103).

Figure 3:
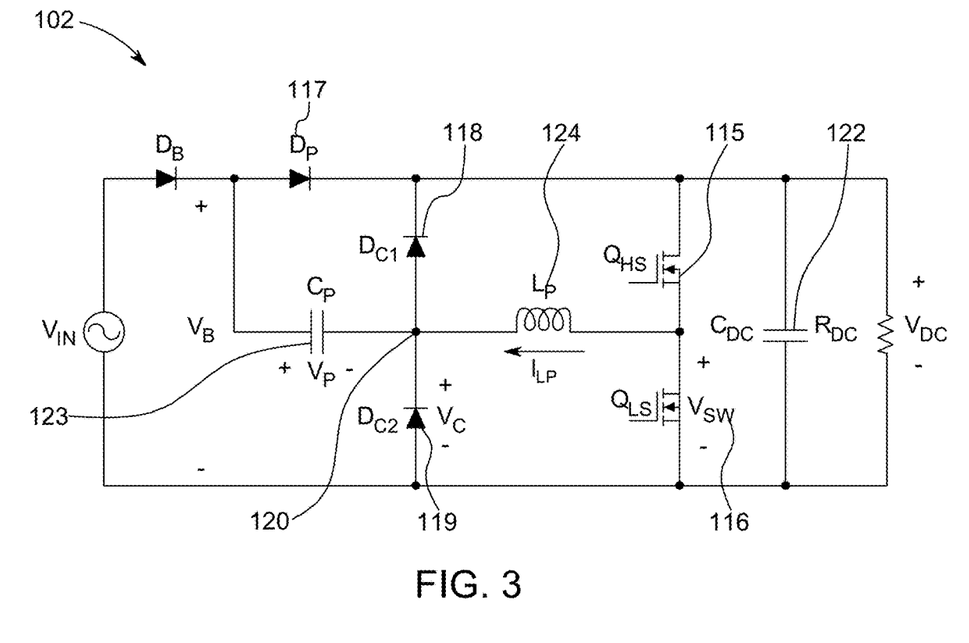
FIG. 3 shows an embodiment of the presently disclosed charge-pump-based power factor correction sub-converter.

FIG. 3 shows an embodiment of the presently disclosed charge-pump-based power factor correction sub-converter (102). An inductor (124, $L_P$) is added in series with the charge pump capacitor (123, $C_P$) to smooth the capacitor current. That, however, may result in reduction of the power factor, as the voltage change across the capacitor is no longer equal to the input voltage with the voltage drop across the inductor. To bind the voltage across the capacitor to the input voltage, two clamping diodes (118, $D_{C1}$, 119, $D_{C2}$) are added to clamp $V_C$ to a maximum voltage of $V_{DC}$ and minimum voltage of zero.

Figure 4:
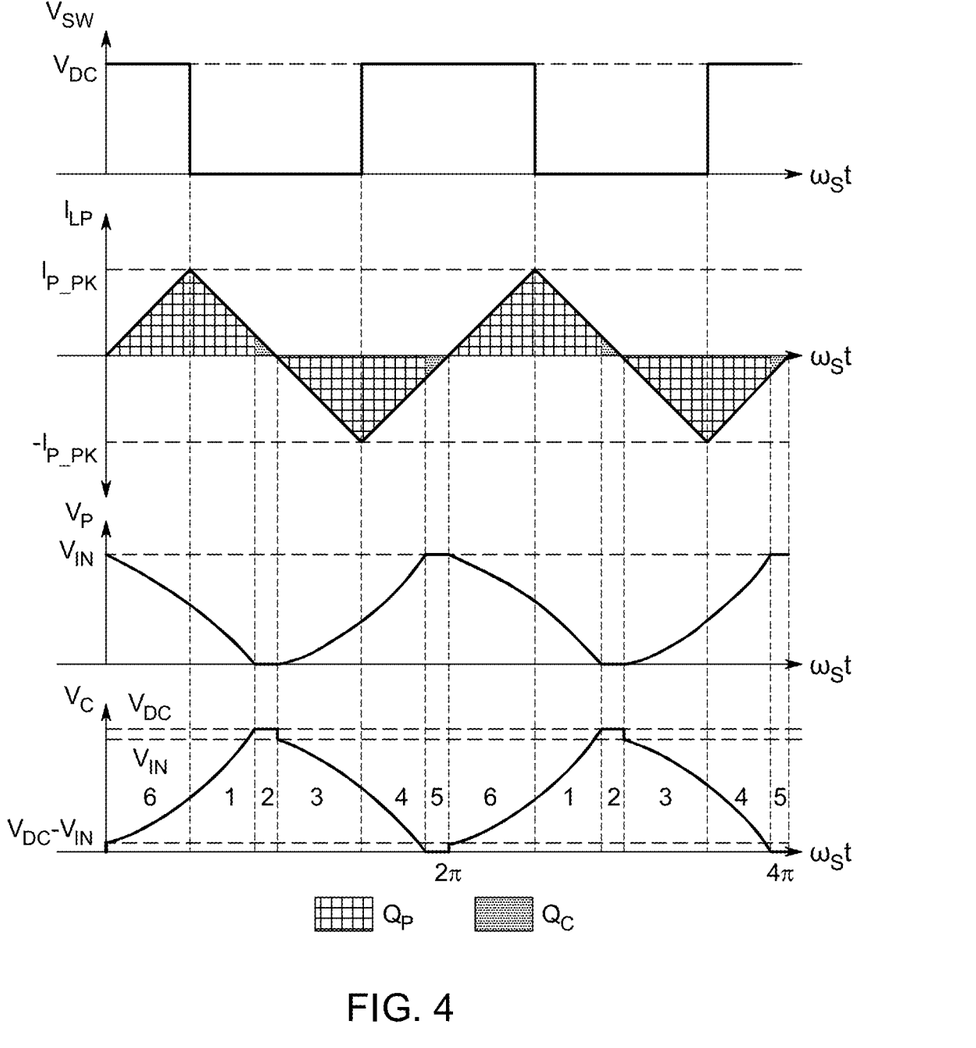
FIG. 4 shows operation across two switching cycles of the presently disclosed charge-pump-based power factor correction sub-converter.
Figure 5A:
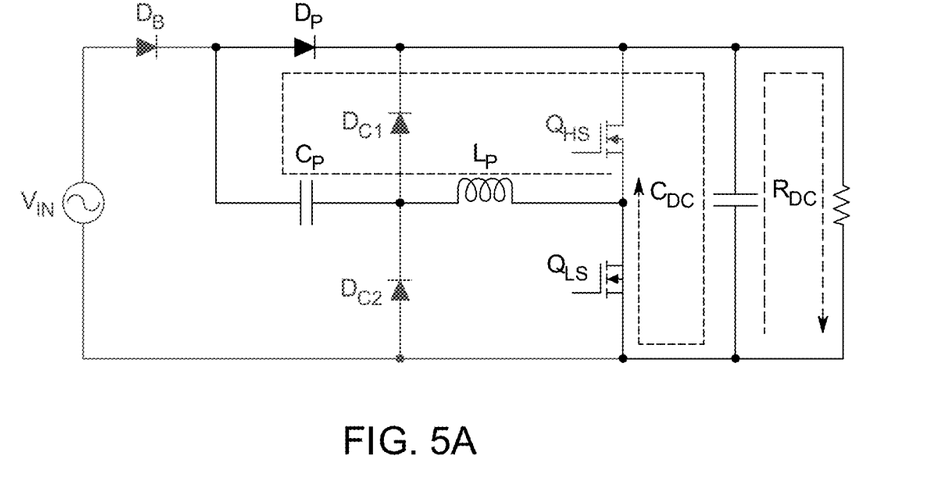
FIG. 5 shows equivalent circuits with charge-pump circuit current paths and load current paths across different intervals of operation of the presently disclosed charge-pump-based power factor correction sub-converter.
Figure 5B:
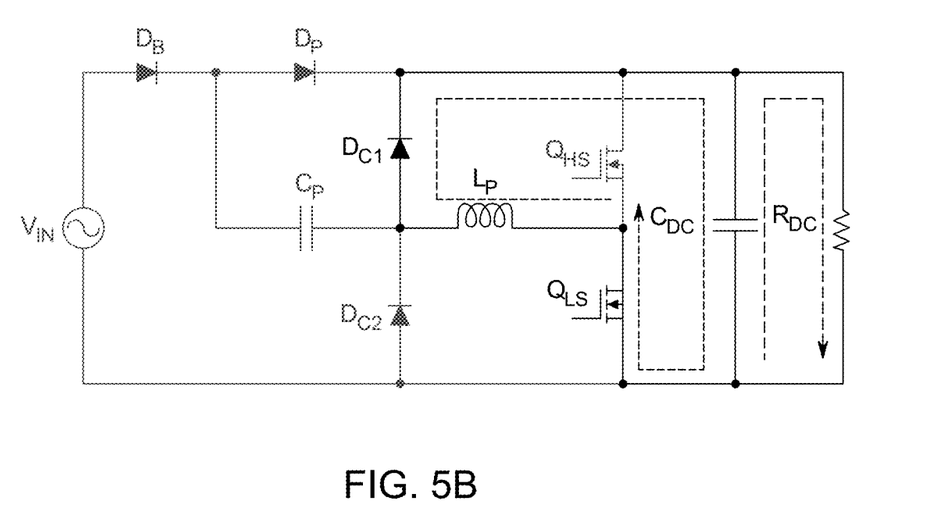
Figure 5C:
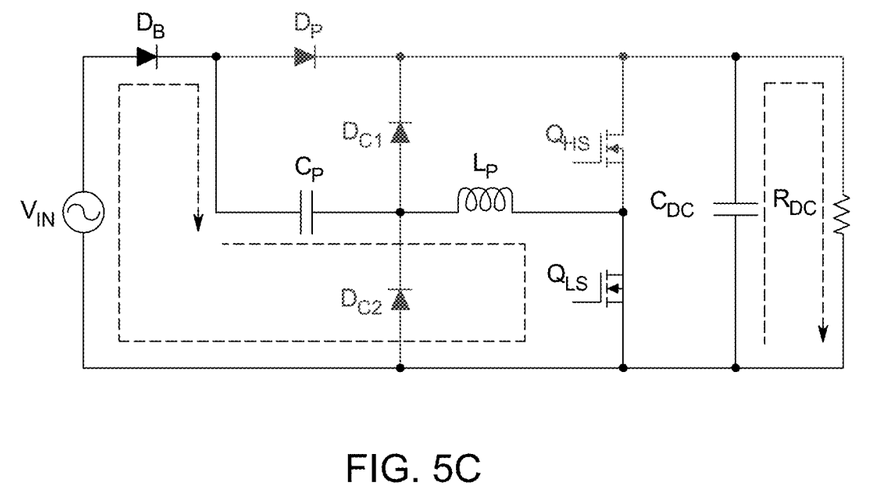
Figure 5D:
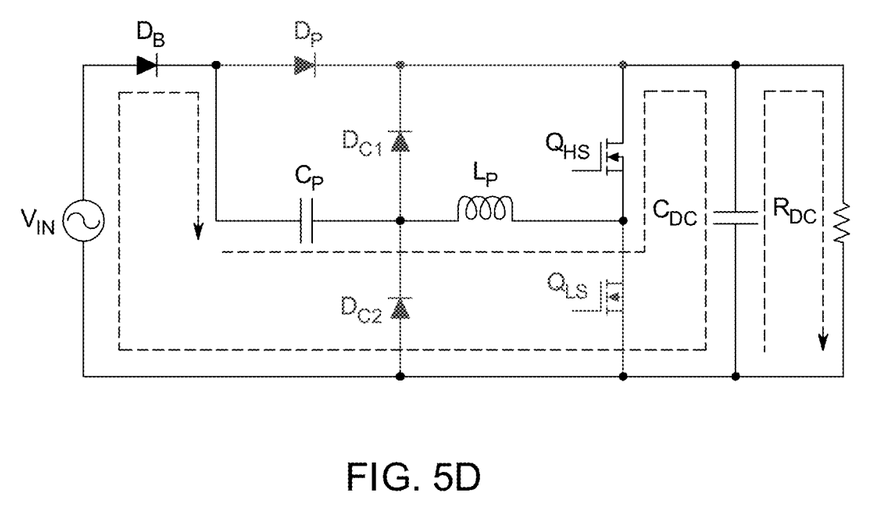
Figure 5E:
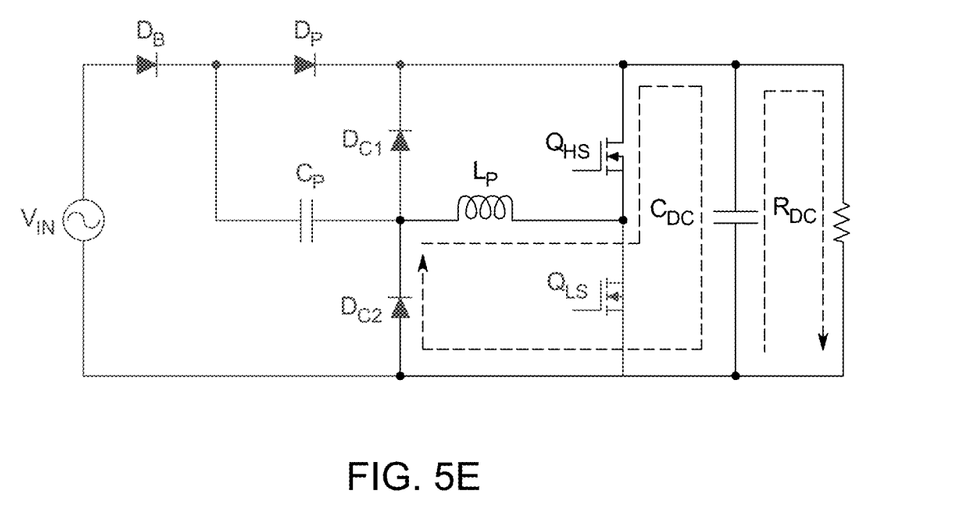
Figure 5F:
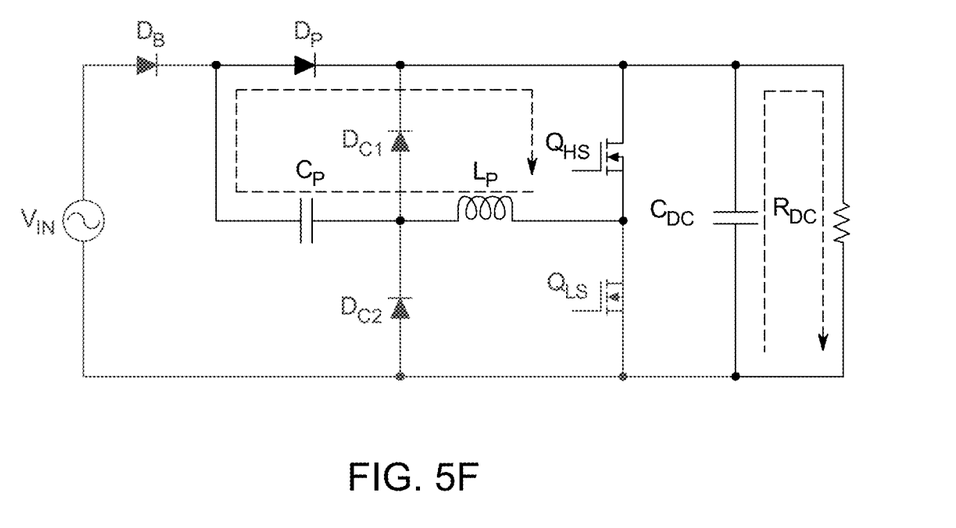
Figure 6A:
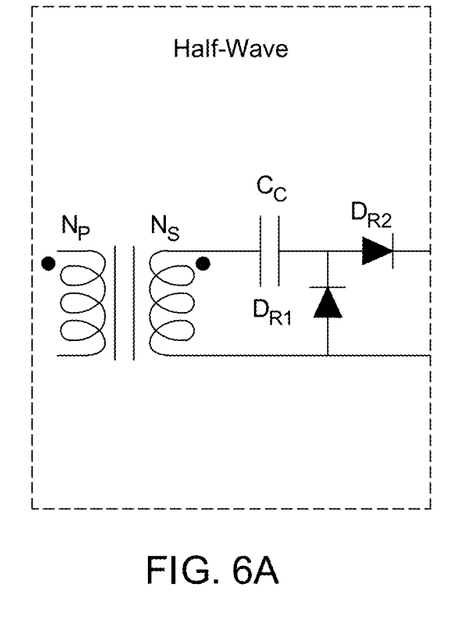
FIG. 6 shows different implementations of the output rectification circuit.
Figure 6B:
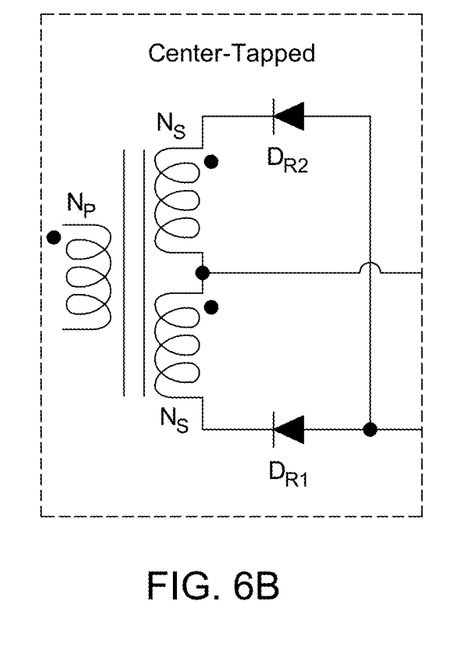
Figure 6C:
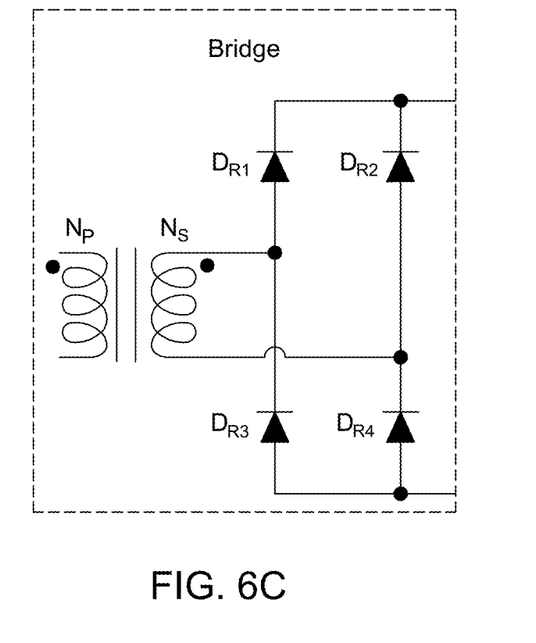

FIG. 4 shows operation across two switching cycles of the presently disclosed charge-pump-based power factor correction sub-converter (102).

The presently disclosed AC-DC power converter may operate according to a series of intervals in every switching cycle. According to one embodiment, the AC-DC power converter is configured to operate in six intervals every switching cycle, wherein:

in a first interval, energy stored in the charge pump capacitor ($C_P$) is discharged to the energy-storage capacitor ($C_{DC}$), in a second interval, the first clamping diode ($D_{C1}$) turns on and a charge pump current ($I_{LP}$) through the charge pump inductor ($L_P$) decreases to zero, in a third interval, the high-side switch ($Q_{HS}$) is off, the low-side switch ($Q_{LS}$) is on, and the charge pump capacitor ($C_P$) is charged from the rectified line voltage, in a fourth interval, the high-side switch ($Q_{HS}$) is on, the low-side switch ($Q_{LS}$) is off, and the charge pump capacitor ($C_P$) is further charged from the rectified line voltage, in a fifth interval, the second clamping diode ($D_{C2}$) turns on and the charge pump current ($I_{LP}$) increases, in a sixth interval, part of the energy stored in the charge pump capacitor ($C_P$) is released into a charge pump inductor ($L_P$).

FIG. 5 shows equivalent circuits with charge-pump circuit current paths and load current paths across the different intervals of operation of the presently disclosed charge-pump-based power factor correction sub-converter.

In the example of FIG. 5, Interval 1 starts once the half-bridge switches, with the high-side switching off and low-side on. The energy stored in the pump capacitor is discharged in $C_{DC}$. $I_{LP}$ decreases linearly, with the voltage across the pump capacitor decreasing until it reaches zero, while $V_C$ keep increasing until it reaches $I_{DC}$. At that point, Interval 2 starts, where $D_{C1}$ turns on and $V_C$ is clamped to $V_{DC}$, while $I_{LP}$ continues decreasing until it reaches zero. Meanwhile, no current flows in $C_P$. Interval 3 starts once the energy in the charge-pump tank gets depleted. $D_{C1}$ stops conducting and $D_B$ turns on to charge $C_P$ by the line input current. This interval terminates when the half-bridge switches again and Interval 4 begins. In that interval, the high-side switch is on and the low-side is off. $D_B$ continues to conduct until $C_P$ is charged to $V_{IN}$, while $V_C$ decreases to zero. At that point, interval 5 starts and $D_{C2}$ turns on, clamping $V_C$ to zero. $I_{LP}$ linearly increases as a positive voltage of $V_{DC}$ is applied across it and the interval ends once it reaches zero. Interval 6 then starts, where part of the energy stored in $C_P$ is released into $L_P$ while the charge-pump tank current freewheels through $D_P$ and $Q_{HS}$. By the end of that interval, $Q_{HS}$ turns off, and the next switching cycle begins. The analysis shows that the AC line input current is discontinuous and equal to the pump capacitor charging current, which is equal to $I_{LP}$ in Intervals 3 and 4. In addition, the voltage across the pump capacitor is changing between $V_{IN}$ and zero every switching cycle, and accordingly unity power factor is achieved.

A non-limiting example of a design process and design considerations for the AC-DC converter is described in the following.

Charge-Pump Capacitor Design

The charge pump capacitor may be designed for handling the maximum line input current.

The input power averaged over a switching cycle is given by $$P_{IN} = V_{IN} \cdot I_{IN} = f_s \cdot C_P \cdot V_{IN}^2$$

where the input voltage is a sinusoid of the line frequency $$V_{IN} = V_{IN\_pk} \sin(\omega_l t)$$

The input power can be obtained as follows:

$$P_{IN\_avg} = \frac{1}{T_l} \int_0^{T_l} P_{IN} dt = \frac{2}{T_l} \int_0^{\frac{T_l}{2}} P_{IN} dt$$

$$P_{IN\_avg} = \frac{1}{2} f_s \cdot C_P \cdot V_{IN\_pk}^2$$

$C_P$ can then be written as:

$$C_P = \frac{2 P_{OUT}}{\eta \cdot f_s \cdot V_{IN\_pk}^2}$$

Charge-Pump Inductor Design

The size of the charge pump inductor determines the length of intervals 2 and 5 (the intervals are described below), during which the clamping diodes conduct to clamp the voltage on the charge-pump capacitor and achieve high power factor.

$I_{LP}$ can be calculated from the total charge $Q_P$ as follows $$Q_P = C_P \cdot V_P = \frac{1}{2} \cdot \frac{T_s}{2} \cdot I_{LP}$$

$$I_{P\_pk} = 4 \cdot \frac{C_P \cdot V_P}{T_s} = 4 \cdot f_s \cdot C_P \cdot V_P$$

Arranging for $L_P$:

$$L_P = \frac{1}{16 \cdot C_P \cdot f_s^2}$$

Energy-Storage Capacitor Design

The energy-storage capacitor may be designed to store the difference between the instantaneous input power and the constant output power, as follows.

$$P_{DC} = P_{IN} - P_{OUT}$$

$$P_{IN} = V_{IN\_pk} \cdot I_{IN\_pk} \sin^2(\omega_l t) = \frac{V_{IN\_pk} \cdot I_{IN\_pk}}{2}[1 - \cos(2\omega_l t)]$$

The output power can then be calculated as:

$$P_{OUT} = P_{IN_{avg}} = \frac{V_{IN\_pk} \cdot I_{IN\_pk}}{2}$$

$$P_{DC} = -P_{OUT} \cos(2\omega_l t)$$

The energy is calculated as:

$$E_{DC} = \int_0^{T_l} P_{DC} dt = E_{DC}(0) - \frac{P_{OUT} \sin(2\omega_l t)}{2\omega_l} = \frac{1}{2} C_{DC} \cdot V_{DC}^2$$

$V_{DC}$ can then be calculated as:

$$V_{DC} = V_{DC\_rms} \sqrt{1 - \frac{P_{OUT}}{\omega_l \cdot C_{DC} \cdot V_{DC\_rms}^2} \sin(2\omega_l t)}$$

With the AC ripple being sufficiently smaller than the rms voltage, the ripple amplitude can be evaluated by $$V_{DC\_ripple} \approx \frac{P_{OUT}}{2\omega_l \cdot C_{DC} \cdot V_{DC\_rms}}$$

The energy-storage capacitor $C_{DC}$ can then be sized such that the voltage across it is higher than the peak input voltage across the line cycle. That guarantees that no cross-conduction occurs through the diode bridge and the pump diode, and accordingly the input current is forced into the pump circuit that achieves PFC.

Preferably, for a high power factor, the following condition should be satisfied.

$$V_{DC\_ripple} < V_{DC} - V_{IN\_pk}$$

Considering a conservative substitution of the average voltage for the rms, the sizing of the energy-storage capacitor for a given average bus voltage can be found from $$C_{DC} \geq \frac{P_{OUT}}{2\omega_l \cdot V_{DC} \cdot (V_{DC} - V_{IN\_pk})}$$

Circuit Stress Analysis

Starting with the energy-storage capacitor, the maximum voltage across the capacitor is equal to the maximum allowed voltage ripple on top of the average value.

$$V_{DC\_max} = V_{DC} + (V_{DC} - V_{IN\_pk}) = 2 \cdot V_{DC} - V_{IN\_pk}$$

With respect to the charge-pump circuit, the voltage stress across the pump capacitor can be clamped to the input voltage, and accordingly the voltage stress across the capacitor is:

$$V_{F\_max} = V_{IN\_pk}$$

The current stress in the pump circuit inductor can be expressed as $$I_{P\_max} = 4 \cdot f_S \cdot C_P \cdot V_{In\_pk}$$

The pump diodes stresses are equal to $$V_{DP\_max} = V_{DC\_max}$$

$$I_{DP\_max} = I_{P\_max}$$

where the clamping diodes are rated for the same voltage as the pump diode, yet for a lower current stress, which depends on the accuracy of the design of the pump inductor.

The class-DE resonant tank components stresses can be calculated from the following formula (with a conservative assumption of operation at resonance).

$$V_{RES\_max} = \frac{2 \cdot V_{DC\_max} \cdot Q_L}{\pi}$$

$$I_{RES\_max} = \frac{2 \cdot V_{DC\_max}}{\pi \cdot R_{REC}}$$

The class-DE stage rectifier diodes stresses can then be calculated as follows $$V_{DR\_max} = V_{OUT}$$

$$I_{DR\_max} = \frac{\pi \cdot I_{OUT}}{2} = \frac{\pi \cdot P_{OUT}}{2 \cdot V_{OUT}}$$

The voltage stress across the half-bridge switches and the energy storage capacitor is calculated as $$V_{S\_max} = V_{DC\_max}$$

The current in the switches is equal to the sum of the pump-circuit inductor and the class-DE resonant tank currents. With a conservative assumption of zero phase difference between the two currents, the current stress in the switches is then equal to $$I_{S\_max} = I_{P\_max} = I_{RES\_max}$$

Achieving ZVS Operation

Assuming operation at the class-DE stage tank resonant frequency, the resonant tank voltage gain is unity. The expression for the turns ratio may be provided as $$n = \frac{2 \cdot V_{OUT}}{V_{DC}}$$

Consequently:

$$I_{RES\_max} = \frac{\pi \cdot P_{OUT}}{V_{DC}}$$

and:

$$I_{P\_max} = \frac{8 \cdot V_{DC\_max}}{\eta \cdot \pi \cdot V_{IN\_pk}} \cdot I_{RES\_max}$$

With a conservative assumption of $V_{DC\_max}$ being equal to $V_{IN\_pk}$ and 100% efficiency, the pump-circuit branch current amplitude is at least 2.5 times the class-DE stage branch current amplitude. Accordingly, the pump-circuit branch current is the one defining the criteria for achieving ZVS operation for most of the line cycle. The resonant frequency of the pump-circuit tank can then be obtained as follows.

$$f_P = \frac{1}{2 \cdot \pi \cdot \sqrt{L_P \cdot C_P}} = \frac{2f_s}{\pi}$$

Accordingly, the switching frequency is sufficiently higher than the pump tank resonant frequency, which results in inductive-mode of operation for the pump circuit branch and ZVS operation is achieved.

Experimental Results for an Embodiment

Figure 7A:
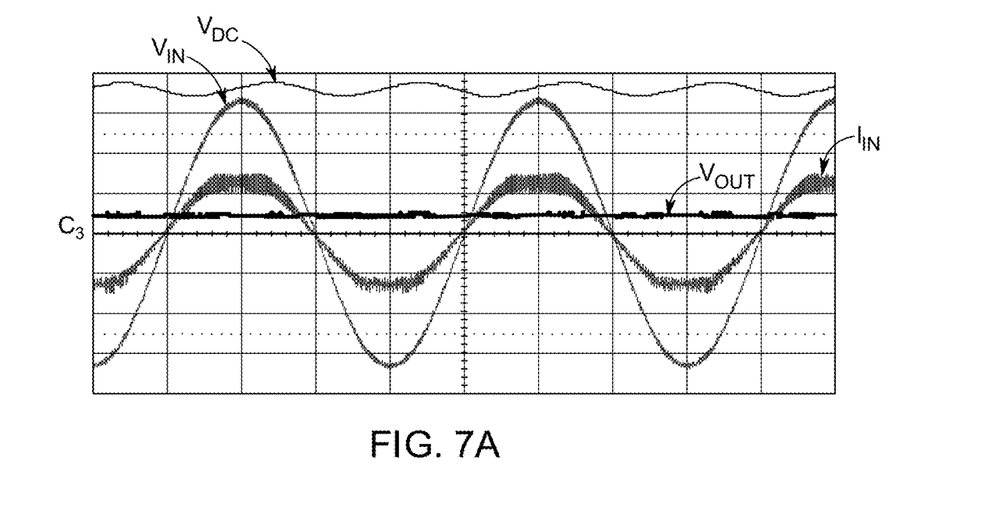
FIG. 7 shows waveforms for a number of signals during operation of an embodiment of the presently disclosed AC-DC converter.
Figure 7B:
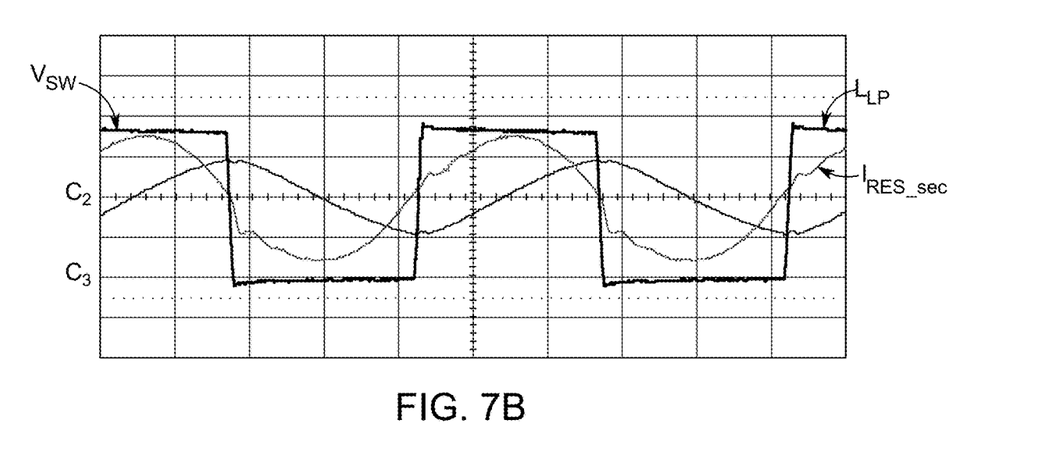

FIG. 7 shows waveforms for a number of signals during operation of an embodiment of the presently disclosed AC-DC converter. FIG. 7A shows the line-frequency waveforms, including the input voltage and current, output voltage and the voltage across the energy-storage capacitor $C_{DC}$. The figure shows an almost-sinusoidal input current in phase with the input voltage, and an average output voltage of 47 V. FIG. 7B shows the switching-frequency signals at full-load operation. The transformer-secondary current is seen to be sinusoidal owing to the operation at resonance, thus ensuring the validity of the design process of the class-DE stage, which is based on the FHA approach. On the other hand, the pump-circuit inductor current is seen to be triangular, as the switching frequency is considerably higher than the charge-pump tank resonant frequency. The pump inductor current has an amplitude that is larger than the class-DE resonant tank current primary, which is 1/n times the transformer secondary current. The figure shows that the pump-circuit current is lagging the switching-node voltage, and accordingly full ZVS is obtained.

The present disclosure further relates to a method of converting an AC line voltage to a DC output voltage or DC output current, the method comprising the steps of:
  providing an AC-DC power converter as disclosed herein;
  operating the AC-DC power converter by:
  a. adjusting the DC output voltage or DC output current by adjusting the switching frequency of the controllable switch network, and/or
  b. adjusting the DC output voltage or DC output current by adjusting on/off duty cycle modulation of the controllable switch network.

The presently disclosed method of converting an AC line voltage to a DC output voltage or DC output current may be performed using any embodiment of the presently disclosed AC-DC power converter, including the step of configuring the AC-DC converter in any of the described configurations and/or controlling and/or adjusting the AC-DC converter according to any of the described embodiments. According to one embodiment, the presently disclosed method of converting an AC line voltage to a DC output voltage or DC output current further comprises the step of applying burst-mode control, wherein the AC-DC power converter is configured to be operated in either a pulse width modulation mode or a pulse skipping mode.

LIST OF ELEMENTS IN FIGURES

100—AC_DC converter
101—resonant sub-converter
102—charge-pump-based power factor correction sub-converter
103—controllable switch network
104—AC line voltage
105—DC output voltage/current
106—AC rectification circuit
107—resonant tank
108—output rectification circuit
110—rectified line voltage
111—DC-bus supply voltage
112—controller
113—resonant capacitor
114—resonant inductor
115—high-side switch
116—low-side switch
117—charge pump rectifying element
118,119—clamping diodes
120—charge pump node
121—switch network node
122—energy-storage capacitor
123—charge-pump capacitor
124—charge pump inductor

The invention claimed is:

1. An AC-DC power converter comprising:
an AC rectification circuit configured to convert an AC line voltage into a rectified line voltage;
a charge-pump-based power factor correction sub-converter configured to provide a DC-bus supply voltage;
a resonant sub-converter configured to convert the DC-bus supply voltage to a DC output voltage or DC output current, the resonant sub-converter comprising:
a resonant tank configured to convert the DC-bus supply voltage to a resonant voltage or current;
an output rectification circuit configured to generate the DC output voltage or DC output current from the resonant voltage or current to supply a converter load,
a controllable switch network shared by the charge-pump-based power factor correction sub-converter and the resonant sub-converter,
wherein the resonant tank is decoupled from the charge-pump-based power factor correction sub-converter, wherein the AC-DC power converter is configured to operate the resonant tank independently of a power factor correction operation of the charge-pump-based power factor correction sub-converter,
wherein the controllable switch network comprises a high-side switch ($Q_{HS}$) and a low-side switch ($Q_{LS}$) in a half-bridge bridge configuration,
wherein the charge-pump-based power factor correction sub-converter comprises a charge pump rectifying element ($D_P$) connected between the rectified line voltage and the high-side switch ($Q_{HS}$).

2. The AC-DC power converter according to claim 1, wherein the AC-DC converter is configured such that a first current path for the charge-pump-based power factor correction sub-converter is separate from a second current path for an output load gained through the resonant tank.

3. The AC-DC power converter according to claim 1, comprising a controller configured to regulate the DC-bus supply voltage or the DC output voltage or DC output current based on the AC line voltage, the DC-bus supply voltage or the DC output voltage or DC output current.

4. The AC-DC power converter according to claim 1, wherein the controller is configured to adjust the DC output voltage or DC output current in accordance with a DC reference voltage or current.

5. The AC-DC power converter according to claim 4, wherein the controller is configured to:
adjust the DC output voltage or DC output current by adjusting the switching frequency of the controllable switch network, or
adjust the DC output voltage or DC output current by adjusting on/off duty cycle modulation of the controllable switch network,
preferably wherein the controller is further configured to apply burst-mode control.

6. The AC-DC power converter according to claim 1, wherein the resonant tank is a series-resonant tank comprising a resonant capacitor ($C_{RES}$) and a resonant inductor ($L_{RES}$) serially connected.

7. The AC-DC power converter according to claim 1, further comprising an energy-storage capacitor ($C_{DC}$) arranged in parallel with the controllable switch network.

8. The AC-DC power converter according to claim 1, wherein the charge-pump-based power factor correction sub-converter comprises a charge pump capacitor ($C_P$) and a charge pump inductor ($L_P$) serially connected between the rectified line voltage and a switch network node defined by a connection between the high-side switch ($Q_{HS}$) and the low-side switch ($Q_{LS}$).

9. The AC-DC power converter according to claim 1, wherein the AC-DC power converter is configured for zero voltage switching of the controllable switch network.

10. The AC-DC power converter according to claim 1, wherein the AC-DC power converter is configured to operate in six intervals every switching cycle, wherein:
in a first interval, energy stored in a charge pump capacitor ($C_P$) is discharged to an energy-storage capacitor ($C_{DC}$),
in a second interval, a first clamping diode ($D_{C1}$) turns on and a charge pump current ($I_{LP}$) through a charge pump inductor ($L_P$) decreases to zero,
in a third interval, the high-side switch ($Q_{HS}$) is off, the low-side switch ($Q_{LS}$) is on, and the charge pump capacitor ($C_P$) is charged from the rectified line voltage,
in a fourth interval, the high-side switch ($Q_{HS}$) is on, the low-side switch ($Q_{LS}$) is off, and the charge pump capacitor ($C_P$) is further charged from the rectified line voltage,
in a fifth interval, a second clamping diode ($D_{C2}$) turns on and the charge pump current ($I_{LP}$) increases,
in a sixth interval, part of the energy stored in the charge pump capacitor ($C_P$) is released into the charge pump inductor ($L_P$).

11. The AC-DC power converter according to claim 1, wherein the charge-pump-based power factor correction sub-converter comprises two clamping diodes ($D_{C1}$, $D_{C2}$) connected to a charge pump node defined by a connection between a charge pump capacitor ($C_P$) and a charge pump inductor ($L_P$).

12. The AC-DC power converter according to claim 11, wherein a first clamping diode ($D_{C1}$) of two clamping diodes is connected between the charge pump node and a cathode of the charge pump rectifying element ($D_P$), and wherein a second clamping diode ($D_{C2}$) of two clamping diodes is connected between the charge pump node and a negative terminal of the rectified line voltage.

13. A method of converting an AC line voltage to a DC output voltage or DC output current, the method comprising the steps of:
providing an AC-DC power converter comprising:
an AC rectification circuit configured to convert an AC line voltage into a rectified line voltage;
a charge-pump-based power factor correction sub-converter configured to provide a DC-bus supply voltage;
a resonant sub-converter configured to convert the DC-bus supply voltage to a DC output voltage or DC output current, the resonant sub-converter comprising:
a resonant tank configured to convert the DC-bus supply voltage to a resonant voltage or current;
an output rectification circuit configured to generate the DC output voltage or DC output current from the resonant voltage or current to supply a converter load,
a controllable switch network shared by the charge-pump-based power factor correction sub-converter and the resonant sub-converter,
wherein the resonant tank is decoupled from the charge-pump-based power factor correction sub-converter,
wherein the AC-DC power converter is configured to operate the resonant tank independently of a power factor correction operation of the charge-pump-based power factor correction sub-converter,
wherein the controllable switch network comprises a high-side switch ($Q_{HS}$) and a low-side switch ($Q_{LS}$) in a half-bridge bridge configuration,
wherein the charge-pump-based power factor correction sub-converter comprises a charge pump rectifying element ($D_P$) connected between the rectified line voltage and the high-side switch ($Q_{HS}$);
operating the AC-DC power converter by:
adjusting the DC output voltage or DC output current by adjusting the switching frequency of the controllable switch network, or
adjusting the DC output voltage or DC output current by adjusting on/off duty cycle modulation of the controllable switch network.

14. An AC-DC power converter comprising:
an AC rectification circuit configured to convert an AC line voltage into a rectified line voltage;
a charge-pump-based power factor correction sub-converter configured to provide a DC-bus supply voltage;
a resonant sub-converter configured to convert the DC-bus supply voltage to a DC output voltage or DC output current, the resonant sub-converter comprising:
a resonant tank configured to convert the DC-bus supply voltage to a resonant voltage or current;
an output rectification circuit configured to generate the DC output voltage or DC output current from the resonant voltage or current to supply a converter load,
a controllable switch network shared by the charge-pump-based power factor correction sub-converter and the resonant sub-converter,
wherein the resonant tank is decoupled from the charge-pump-based power factor correction sub-converter,
wherein the AC-DC power converter is configured to operate the resonant tank independently of a power factor correction operation of the charge-pump-based power factor correction sub-converter,
wherein the AC-DC power converter is configured to operate in six intervals every switching cycle, wherein:
in a first interval, energy stored in a charge pump capacitor ($C_P$) is discharged to an energy-storage capacitor ($C_{DC}$),
in a second interval, a first clamping diode ($D_{C1}$) turns on and a charge pump current ($I_{LP}$) through a charge pump inductor ($L_P$) decreases to zero,
in a third interval, a high-side switch ($Q_{HS}$) is off, a low-side switch ($Q_{LS}$) is on, and the charge pump capacitor ($C_P$) is charged from the rectified line voltage,
in a fourth interval, the high-side switch ($Q_{HS}$) is on, the low-side switch ($Q_{LS}$) is off, and the charge pump capacitor ($C_P$) is further charged from the rectified line voltage,
in a fifth interval, a second clamping diode ($D_{C2}$) turns on and the charge pump current ($I_{LP}$) increases,
in a sixth interval, part of the energy stored in the charge pump capacitor ($C_P$) is released into the charge pump inductor ($L_P$).

15. A method of converting an AC line voltage to a DC output voltage or DC output current, the method comprising the steps of:
providing an AC-DC power converter comprising:
an AC rectification circuit configured to convert an AC line voltage into a rectified line voltage;
a charge-pump-based power factor correction sub-converter configured to provide a DC-bus supply voltage;
a resonant sub-converter configured to convert the DC-bus supply voltage to a DC output voltage or DC output current, the resonant sub-converter comprising:
a resonant tank configured to convert the DC-bus supply voltage to a resonant voltage or current;
an output rectification circuit configured to generate the DC output voltage or DC output current from the resonant voltage or current to supply a converter load,
a controllable switch network shared by the charge-pump-based power factor correction sub-converter and the resonant sub-converter,
wherein the resonant tank is decoupled from the charge-pump-based power factor correction sub-converter,
wherein the AC-DC power converter is configured to operate the resonant tank independently of a power factor correction operation of the charge-pump-based power factor correction sub-converter,
operating the AC-DC power converter by:
adjusting the DC output voltage or DC output current by adjusting the switching frequency of the controllable switch network, or
adjusting the DC output voltage or DC output current by adjusting on/off duty cycle modulation of the controllable switch network,
wherein the AC-DC power converter is configured to operate in six intervals every switching cycle, the method comprising the steps of:
in a first interval, discharging energy stored in a charge pump capacitor ($C_P$) to an energy-storage capacitor ($C_{DC}$),
in a second interval, turning on a first clamping diode ($D_{C1}$) to decrease a charge pump current ($I_{LP}$) through a charge pump inductor ($L_P$) to zero, in a third interval, turning off a high-side switch ($Q_{HS}$) and turning on a low-side switch ($Q_{LS}$) to charge the charge pump capacitor ($C_P$) from the rectified line voltage, in a fourth interval, turn on the high-side switch ($Q_{HS}$) and turn off the low-side switch ($Q_{LS}$) to further charge the charge pump capacitor ($C_P$) from the rectified line voltage, in a fifth interval, turning on a second clamping diode ($D_{C2}$) to increase the charge pump current ($I_{LP}$), in a sixth interval, releasing part of the energy stored in the charge pump capacitor ($C_P$) into the charge pump inductor ($L_P$).

* * * * *